United States Patent
Stewart

(10) Patent No.: US 11,887,059 B2
(45) Date of Patent: Jan. 30, 2024

(54) APPARATUS AND METHODS FOR CREATING A VIDEO RECORD

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 18/084,984

(22) Filed: Dec. 20, 2022

(65) Prior Publication Data

US 2023/0289734 A1 Sep. 14, 2023

Related U.S. Application Data

(63) Continuation of application No. 17/690,451, filed on Mar. 9, 2022, now Pat. No. 11,556,898.

(51) Int. Cl.
*G06Q 10/1053* (2023.01)
*H04L 9/32* (2006.01)
*G06F 3/16* (2006.01)
*H04L 9/00* (2022.01)

(52) U.S. Cl.
CPC .......... *G06Q 10/1053* (2013.01); *G06F 3/16* (2013.01); *H04L 9/3236* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 9,548,048 B1* | 1/2017 | Solh | G06V 40/20 |
| 2012/0221477 A1* | 8/2012 | Pande | G06Q 10/1053 |
| | | | 705/321 |
| 2014/0236850 A1* | 8/2014 | Holland | G06Q 10/1053 |
| | | | 705/321 |
| 2018/0336241 A1* | 11/2018 | Noh | G06F 16/242 |
| 2018/0336528 A1* | 11/2018 | Carpenter | G06F 16/3334 |
| 2020/0105156 A1* | 4/2020 | Naidu | G06N 20/00 |
| 2020/0134568 A1* | 4/2020 | Karri | G06Q 10/1053 |
| 2021/0233031 A1* | 7/2021 | Preuss | G06F 3/011 |
| 2022/0000560 A1* | 1/2022 | Sweis | G16H 30/40 |

(Continued)

OTHER PUBLICATIONS

S. Mhadgut, N. Koppikar, N. Chouhan, P. Dharadhar and P. Mehta, "vRecruit: An Automated Smart Recruitment Webapp using Machine Learning," 2022 International Conference on Innovative Trends in Information Technology (ICITIIT), 2022, pp. 1-6, doi: 10.1109/ICITIIT54346.2022.9744135. (Year: 2022).*

(Continued)

*Primary Examiner* — Laura Yesildag
(74) *Attorney, Agent, or Firm* — Caldwell Intellectual Property Law

(57) ABSTRACT

An apparatus for creating a video record is disclosed. The apparatus includes a processor communicatively connected to a user device and a memory communicatively connected to the processor. The memory contains instructions configuring the processor to prompt a user with an initial request, receive an initial response from the user, prompt the user with a subsequent request based on the initial response, receive a subsequent response from the user, and create a video record as a function of the initial response and the subsequent response.

20 Claims, 7 Drawing Sheets

(56) References Cited

U.S. PATENT DOCUMENTS

2022/0092548 A1* 3/2022 Olshansky .............. G10L 15/00

OTHER PUBLICATIONS

R. G. Vishruth, R. Sunitha, K. S. Varuna, N. Varshini and P. B. Honnavalli, "Resume Scanning and Emotion Recognition System based on Machine Learning Algorithms," 2020 4th International Conference on Electronics, Communication and Aerospace Technology (ICECA), 2020,1127-1132, doi: 10.1109/ICECA493 (Year: 2020).*

R. G. Vishruth, R. Sunitha, et al. "Resume Scanning and Emotion Recognition System based on Machine Learning Algorithms," 2020 4th International Conference on Electronics, Communication and Aerospace Technology (I CECA), 2020, pp. 1127-1132, doi: 10.1109/ICECA49 (Year: 2020).*

L. Hemamou, A. Guillon, J.-C. Martin and C. Clavel, "Multimodal Hierarchical Attention Neural Network: Looking for Candidates Behaviour which Impact Recruiter's Decision," 2021 in IEEE Transactions on Affective Computing, doi: 10.1109/TAFFC.2021.3113159. (Year: 2021).*

I. Naim, M. I. Tanveer, D. Gildea and M. E. Hoque, "Automated Analysis and Prediction of Job Interview Performance," in IEEE Transactions on Affective Computing, vol. 9, No. 2, pp. 191-204, Apr. 1-Jun. 2018, doi: 10.1109/TAFFC.2016.2614299. (Year: 2018).*

L. Nguyen, D. Frauendorfer, M. Mast and D. Gatica-Perez, "Hire me: Computational inference of hirability in employment interviews based on nonverbal behavior", 2014 in IEEE Trans. Multimedia, vol. 16, No. 4, pp. 1018-1031 (Year: 2014).*

L. Chen, R. Zhao, C. W. Leong, B. Lehman, G. Feng and M. E. Hoque, "Automated video interview judgment on a large-sized corpus collected online," 2017 Seventh International Conference on Affective Computing and Intelligent Interaction (ACII), 2017, pp. 504-509, doi: 10.1109/ACII.2017.8273646. (Year: 2017).*

* cited by examiner

APPARATUS AND METHODS FOR CREATING A VIDEO RECORD

CROSS-REFERENCE TO RELATED APPLICATIONS

This application is a continuation of Nonprovisional application Ser. No. 17/690,451, filed on Mar. 9, 2022, and entitled "APPARATUS AND METHODS FOR CREATING A VIDEO RECORD," the entirety of which is incorporated herein by reference.

FIELD OF THE INVENTION

The present invention generally relates to the field of audio and video file creation. In particular, the present invention is directed to apparatus and methods for creating a video record.

BACKGROUND

Video records can be disorganized, lacking pertinent information, and incomplete. It can be burdensome to try to locate the missing information. Furthermore, it can be difficult to organize this information once it has been located.

SUMMARY OF THE DISCLOSURE

In an aspect of the present disclosure is an apparatus for creating a video record, the apparatus including at least a processor communicatively connected to a user device; and a memory communicatively connected to the processor, the memory containing instructions configuring the at least a processor to prompt a user with an initial request, wherein prompting the user with an initial request comprises determining the initial request based on a posting, receive an initial response from the user, prompt the user with a subsequent request based on the initial response, receive a subsequent response from the user, and create a video record as a function of the initial response and the subsequent response.

In another aspect of the present disclosure is a method for creating a video record, the method including: prompting, by a processor, a user with an initial request wherein prompting the user with an initial request comprises determining the initial request based on a posting, receiving, at the processor, an initial response from the user, prompting, by the processor, the user with a subsequent request based on the initial response, receiving, at the processor, a subsequent response from the user, and creating, by the processor, a video record as a function of the initial response and the subsequent response.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
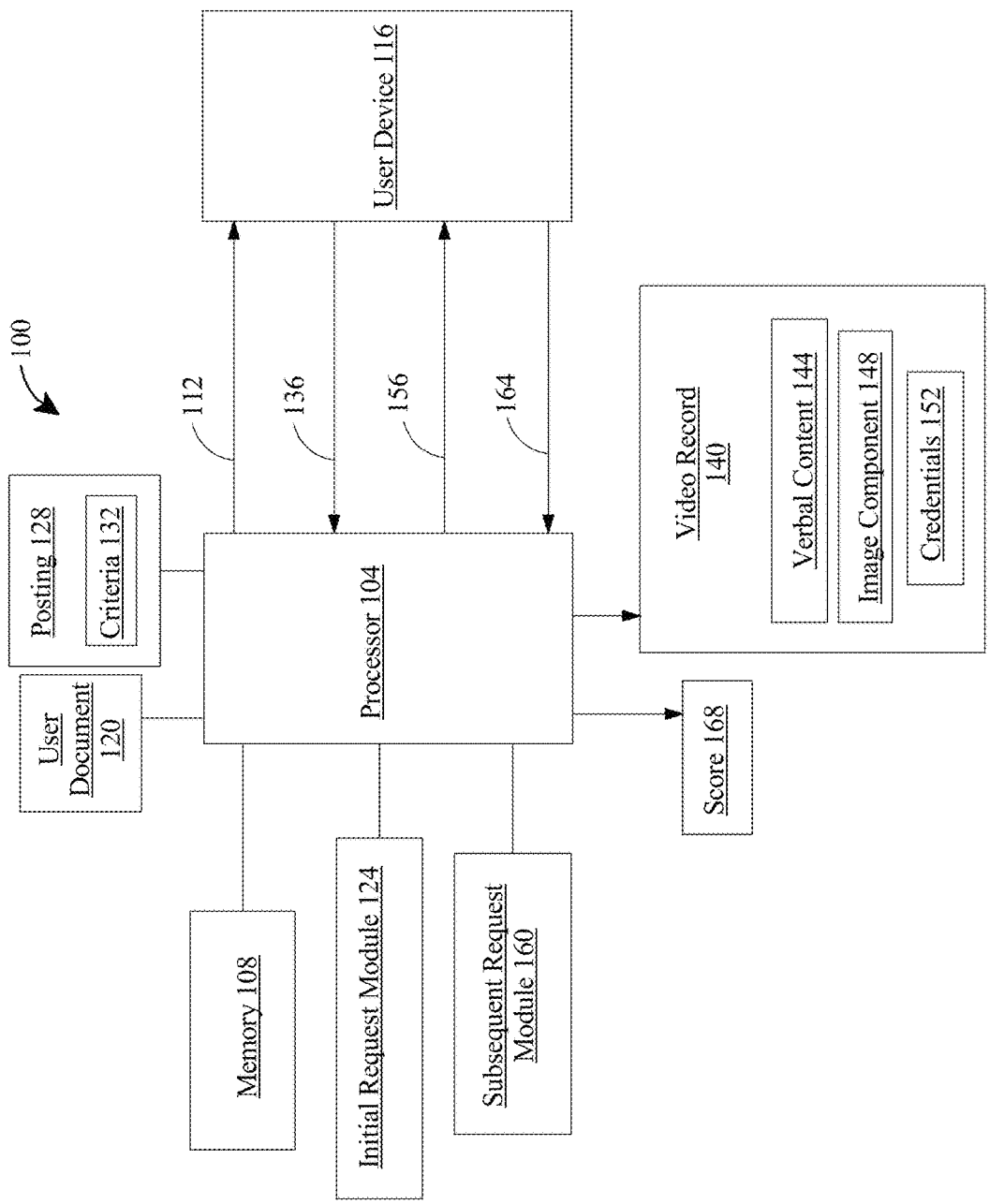
FIG. 1 is a block diagram of an embodiment of an apparatus for creating a video record.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for creating a video record. In an embodiment, an apparatus includes a processor communicatively connected to a user device and a memory communicatively connected to the processor. The memory contains instructions configuring the processor to prompt a user with an initial request, receive an initial response from the user, prompt the user with a subsequent request based on the initial response, receive a subsequent response from the user, and create a video record as a function of the initial response and the subsequent response. The processor may determine the initial request based on a keyword selected by the user. The processor may determine the initial request based on a user document, such as a printed resume or transcript. The processor may generate the subsequent request by utilizing a machine-learning module. The processor may categorize the user and prompt the user with a set of requests associated with the user's category. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $0(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an apparatus for creating a video record is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Apparatus 100 may include a memory 108. Memory 108 may be communicatively connected to processor 104 and may be configured to store information and/or datum related to apparatus 100. In one or more embodiments, memory 108 may be communicatively connected to a processor and configured to contain instructions configuring processor to execute any operations discussed in this disclosure. In one or more embodiments, memory 108 may include a storage device, as described further in this disclosure below.

Processor 104 is configured to prompt a user with an initial request 112. As used in this disclosure, a "user" is an individual seeking employment. As used in this disclosure, a "request" is a request, such as a question, to a user for information about the user. A request may seek information about a user's credentials, as described below. Processor 104 may be communicatively connected to a user device 116 and transmit initial request 112 to the user device 116. Processor 104 may prompt user with requests, as discussed below. Processor 104 may cause user device 116 to prompt user by, as non-limiting examples, audibly reciting the requests over speakers connected to user device 116 and/or visually displaying the requests on a screen of user device. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

As used in this disclosure, a "user device" is a computing device controlled and/or operated by a user. Computing device may be any computing device described in this disclosure, such as a processor communicatively connected to a memory. User device 116 may be a personal computer such as a desktop, laptop, smart phone, and/or the like. Processor 104 may be configured to require information from user device 116, such as a username and a password, to verify the identity of user. Processor 104 may send verification to user, such as an email to user's email address and/or a text message to user's phone saved on a memory and/or database to which processor 104 has access. Verification may include a link to click that sends a verification to processor 104. Verification may include a temporary code for user to then input from user device 116 to confirm that the device is user device 116.

Processor 104 may be configured to receive at least a user document 120 from user device 116, memory, and/or a database such as a user document database. User document database may be implemented, without limitation, as a relational database, a key-value retrieval database such as a NOSQL database, or any other format or structure for use as a database that a person skilled in the art would recognize as suitable upon review of the entirety of this disclosure. User document database may alternatively or additionally be implemented using a distributed data storage protocol and/or data structure, such as a distributed hash table or the like. User document database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. As used in this disclosure, a "user document" is a document that includes information about the user and may include credentials 152 of user. As used in this disclosure, "credentials" are information about a user pertaining to qualifications of the user and may include, for example, skills, accreditations, a minimum grade point average (GPA), degree, major and/or focus of study, prior employment, experience, and/or the like. User document 120 may include a transcript from an educational institution the user attended such as a college transcript, a written resume, a video resume, a letter of recommendation, and/or the like. Initial request 112 may be based on at least a user document 120, such as user's transcript and/or written resume. For example, processor 104 may be configured to utilize optical character recognition (OCR) or any word recognition process discussed in this disclosure to translate written text into machine-encoded text. Processor 104 may identify one or more keywords in user document 120. As used in this disclosure, a "keyword" is an element of word or syntax used to identify and/or match elements to each other. Keyword may include locations such as cities, states, and regions; credentials 152; criteria 132 as discussed below; and/or the like. Keywords may be stored in a database, such as keyword database, from which processor 104 may retrieve the keywords. Keyword database may be implemented, without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, processor 104 may be configured to recognize at least a keyword in user document 120 as a function of visual verbal content. In some cases, recognizing a plurality of keywords in user document 120 may include a language processing module. In some embodiments, samples, and examples of keywords submitted by a hiring entity or apparatus 100 administrator may be used to train language processing module in identifying keywords. For instance, a sample may be a list of synonyms used for common words used by hiring entities, such as "advocate", "attorney-at-law", "counsel", "counselor", "counselor-at-law", "lawyer", and "legal eagle". These samples and examples may additionally be used to classify keywords to similar keywords contained in a plurality of user identifiers, as described further below. Language processing module may include any hardware and/or software module. For example, language processing module may be used to extract from user document 120 all information pertaining to "truck driver". Language processing module may be configured to extract, from user document 120, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by processor 104 and/or language processing module to produce associations between one or more words extracted from at least a user document 120 and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm; such as the forward-back-ward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in the language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into processor 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, identifying keywords in user document 120 may include matching a plurality of keywords to words in user document 120. In some embodiments, matching may include classifying keywords contained in keyword database to similar words contained in user document 120. For example, keywords relating "web developer internship experience" may be matched to similar words in user document 120. Similar words may be based on synonyms of keywords as described above. Matching may occur through a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifier may be configured to output at least a datum that labels or otherwise identifies a set of data that are clustered together, found to be close under a distance metric as described below, or the like. Processor 104 and/or another device may generate classifier using a classification algorithm, defined as a processes whereby processor 104 derives classifier from training data. In an embodiment, training data may include data from a database as described in this disclosure including keyword database, sample and examples of keywords and words similar to keywords, language processing module, and any other training data described throughout this disclosure. Classifier may take the plurality of keywords from keyword database as algorithm inputs. Classifier may then use the training data disclosed above to output data bins of words similar to keywords matched to keywords. Each data bin may be categorized to each keyword and labeled with the keyword. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Words similar to keywords that are classified and labeled according to the corresponding keywords may become keywords and/or be added to keyword database.

Still referring to FIG. 1, processor 104 may be configured to generate classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in a database, and classifying the known sample; this may be performed recursively and/or iteratively to generate classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: $l=\sqrt{\Sigma_{i=0}^{n} a_i^2}$, where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Keyword may be consistent with disclosure of keyword in U.S. patent application Ser. No. 17/690,424 filed on Mar. 9, 2022, and entitled "APPARATUSES AND METHODS FOR LINKING POSTING DATA", which is incorporated herein by reference in its entirety.

Still referring to FIG. 1, in some embodiments, initial request 112 may be based on at least a keyword processor 104 identifies in user document 120. For example, processor 104 may identify "electrical engineering" in user's university transcript and create an initial request 112 concerning electrical engineering such as, "Are you looking for a job in electrical engineering?" or "How many years of experience do you have working as an electrical engineer?" In some embodiments, user may select at least a keyword to indicate a type of job the user is interested in. For example, user may select "teacher" and a subcategory "kindergarten teacher" to identify that the user is seeking employment as a kindergarten teacher. Initial request 112 may include asking user for name, address, email address, phone number, whether they are currently employed, etc.

Still referring to FIG. 1, processor 104 may implement one or more algorithms or generate one or more machine-learning modules, such as initial request module 124, to generate initial request 112 to user. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Initial request module 124 may be generated using training data, such as initial request data. Initial request module 124 may be trained by correlated inputs and outputs of initial request data. Inputs of initial request data may include keywords and/or user documents 120 containing at least a keyword. Outputs of initial request data may include initial requests 112 corresponding to the inputs. Initial request data may be keywords and/or user documents 120 with keywords and corresponding initial requests 112 that have already been determined whether manually, by machine, or any other method. Initial request data may include previous outputs such that initial request module 124 iteratively produces outputs. Initial request module 124 using a machine-learning process may output initial request 112 based on input of at least a keyword and/or at least a user documents 120 containing at least a keyword and initial request data.

With continued reference to FIG. 1, processor 104 may be configured to receive a selection from user device 116 of a posting 128. A "posting," as used in this disclosure, is a communication of a job position for which a prospective employer is seeking or may be seeking one or more candidates to potentially fill the job position. Processor 104 may receive a plurality of postings 128. A posting may include information about the employer such as the employer's name and address; compensation such as a salary, an hourly wage, and/or benefits; a title of the job position; geographical location of where the job will be performed and/or whether the job is to be performed remotely; a description of the job position such as a listing of responsibilities, expectations, and/or goals to be accomplished; criteria 132; and/or the like. A job position may be part-time and/or full-time. Job position may be as an employee and/or contractor. As used in this disclosure, "criteria," are skills, accreditations, a minimum grade point average (GPA), degree, major and/or focus of study, and/or experience. Criteria 132 may include requirements and/or preferences. As used in this disclosure, a "requirement" is a criterion that must be satisfied for a prospective employee to be eligible for consideration for a posting. As used in this disclosure, a "preference" is a desired criterion, but it is not required for a prospective employee to be considered for a posting. Initial request 112 may be based on a specific posting 128, such as a posting 128 for which user has selected to apply. For example, user may select posting 128 for a position as a professor in philosophy at a community college, and initial request 112 may be, without limitation, "How many years have you taught philosophy?", "Have you written any published articles?", or "Please explain your educational background in philosophy." Processor 104 may be configured to analyze whether user document 120 addresses all criteria 132 of posting 128. Initial request 112 may be based on any criteria 132 not addressed in user document 120 or any criteria 132 not satisfactorily explained in the user document 120. For example, if a requirement of criteria 132 is five years experience in a managerial position and processor 104 does not have user document 120, user document 120 does not address an amount of managerial experience, or it is unclear from user document 120 whether user has at least five years of managerial experience, then initial request 112 may ask how many years of managerial experience the user has. Comparing user document 120 and posting 128 may be consistent with disclosure of comparing user datum and posting datum in U.S. patent application Ser. No. 17/582,087 filed on Jan. 24, 2022, and entitled "DIGITAL POSTING MATCH RECOMMENDATION APPARATUS AND METHODS", which is incorporated herein by reference in its entirety. In embodiments in which initial request 112 is based on posting 128, inputs of initial request data may include criteria 132 and/or postings 128 containing criteria 132, and outputs of initial request data may include initial requests 112 corresponding to the inputs. Therefore, initial request module 124 may be configured to output initial request 112 based on posting 128 and/or criteria 132 and initial request data. Additional disclosure pertaining to posting can be found in U.S. patent application Ser. No. 17/582,059 filed on Jan. 24, 2022, and entitled "APPARATUS AND METHODS FOR MATCHING VIDEO RECORDS WITH POSTINGS USING AUDIOVISUAL DATA PROCESSING", the entirety of which in incorporated herein by reference.

With continued reference to FIG. 1, processor 104 is be configured to determine the initial request. This may be done using initial request module 124. The initial request is determined based on posting 128. In some embodiments, processor 104 may be configured to determine the initial request based on a user document 120. In some embodiments, processor 104 may be configured to determine the initial request based on a keyword selected by the user.

Processor 104 may receive posting 128 from a computing device, store and/or retrieve from memory 108, and/or store and/or retrieve from a database such as a posting database. Posting database may be implemented, without limitation, as a relational database, a key-value retrieval database such as a NOSQL database, or any other format or structure for use as a database that a person skilled in the art would recognize as suitable upon review of the entirety of this disclosure. Posting database may alternatively or additionally be implemented using a distributed data storage protocol and/or data structure, such as a distributed hash table or the like. Posting database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 104 is configured to receive an initial response 136 from user. As used in this disclosure, an "initial response" is a response by user to an initial request 112. Processor 104 may receive initial response 136 from a computing device, such as user device 116, through a network, from a database, and/or store the initial response 136 in memory 108 and retrieve from the memory 108. Initial response 136 may be included in a video record 140. Initial response 136 may include credentials 152. Initial response 136 may be video record 140 of user responding to initial request 112, which may also include a video record 140 of the initial request 112. As used in this disclosure, a "video record" is data including an audio recording of a prospective employee for purposes of potentially acquiring a job. The audio recording may include verbal content 144. As used in this disclosure, "verbal content" is comprehensible language-based communication. For example, verbal content 144 may include a monologue. Video record 140 may also include a visual recording of the prospective employee. Visual recording may include an image component 148. As used in this disclosure, "image component" may be a visual representation of information, such as a plurality of temporally sequential frames and/or pictures, related to video record 140. For example, image component 148 may include animations, still imagery, recorded video, and the like. In some cases, credentials 152 may be explicitly conveyed within video record 140. Alternatively, or additionally, in some cases, credentials 152 may be conveyed implicitly in video record 140. Video record 140 may be communicated by way of digital signals, for example between computing devices which are communicatively connected with at least a wireless network. Video record 140 may be compressed to optimize speed and/or cost of transmission of video. Video record 140 may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a video record 140 may be substantially lossless, where substantially no information is lost during compression. Processor 104 may receive posting 128 and/or video record 140 from a user, such as an employer, hiring agency, recruiting firm, and/or a prospective employee. Processor 104 may receive posting 128 and/or video record 140 from a computing device through a network, from a database, and or store posting 128 and/or video record 140 in a memory and retrieve from the memory. Apparatus 100 may include a memory 108. Memory 108 may be communicatively connected to processor 104 and may be configured to store information and/or datum related to apparatus 100, such as initial request 112, subsequent request 156, posting 128 including criteria 132, user document 120, keywords selected by user, video record 140 including initial response 136 and subsequent response 164 with credentials 152.

Still referring to FIG. 1, processor 104 may be configured to extract a plurality of textual elements from video record 140 of initial response 136, which may include credentials 152. Processor 104 may include audiovisual speech recognition (AVSR) processes to recognize verbal content 144 in video records 140. For example, processor 104 may use image component 148 to aid in recognition of audible verbal content 144 such as viewing prospective employee move their lips to speak on video to process the audio content of video record 140. AVSR may use image component 148 to aid the overall translation of the audio verbal content 144 of video records 140. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content 144. For instance, audio vector and image vector may each be concatenated and used to predict speech made by prospective employee, who is 'on camera.'

With continued reference to FIG. 1, processor 104 is configured to analyze initial response 136. Analyzing initial response 136 may include identifying a plurality of credentials 152 from video record 140. In some cases, processor 104 may be configured to recognize at least a keyword as a function of visual verbal content 144. In some cases, recognizing at least keyword may include optical character recognition. In some cases, processor 104 may generate a transcript of much or even all verbal content 144 from video record 140. Processor 104 may use transcript to analyze the content of video record 140 and extract credentials 152.

Still refereeing to FIG. 1, in some embodiments, optical character recognition or optical character reader (OCR) includes automatic conversion of images of written (e.g., typed, handwritten or printed text) into machine-encoded text. In some cases, recognition of at least a keyword from an image component 148 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component 148. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component 148 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component 148. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component 148.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component 148. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image components 124. Since the adaptive classifier may have learned something useful a little too late to recognize characters on the first pass, a second pass is run over the image components 148. Second pass may include adaptive recognition and use characters recognized with high confidence on the first pass to recognize better remaining characters on the second pass. In some cases, two-pass approach may be advantageous for unusual fonts or low-quality image components 148 where visual verbal content 144 may be distorted. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content 144. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may be configured to prompt user with a subsequent request 156 based on initial response 136. Subsequent request 156, similar to initial request 112, may be based on posting 128, at least a user document 120, and/or at least a keyword selected by user. Subsequent request 156 may be a follow up to initial request 112. For example, if initial request 112 is "Are you open to relocating for employment?" and initial response 136 is in the affirmative such as "yes" or "I think so," then subsequent request 156 may be "Which cities, states, or regions would you consider moving to?". As another example, if user indicates in initial response 136 that the user was once employed as a manager of a team of people, subsequent request 156 may ask the user to describe a scenario where the user gave critical feedback to a team member when the team member fell below expectations. Subsequent request 156 may also be based on a specific posting 128 such as, "Would you be willing to relocate to Chicago?" if the posting 128 was for a position located in Chicago. Subsequent request 156 may additionally be based on user document 120. For example, subsequent request 156 may not ask user, "Would you be willing to relocate to Chicago?" if user document 120 shows that user lives in Chicago. As another example subsequent request 156 may be, "Tell me about your experience working for Acme, Inc." if user document 120 states that user's previous work experience includes working for Acme, Inc. Subsequent request 156 may seek additional information related to initial response 136. For example, if initial response 136 is an affirmative response to initial request 112 of whether user has written any published articles, subsequent request 156 may be, for example, "How many published articles have you authored?", "What are the subject matters of the articles?", "In which journals or publications were the articles published", or "what are the titles of the articles?".

Still referring to FIG. 1, processor 104 may implement or utilize one or more algorithms or generate one or more machine-learning modules, such as subsequent request module 160, to generate subsequent request 156 to user. Subsequent request module 160 may be generated using training data, such as subsequent request data. Subsequent request module 160 may be trained by correlated inputs and outputs of subsequent request data. Inputs of subsequent request data may include initial response 136, at least a keyword in initial response 136, initial request 112, and/or user document 120, or posting 128. Outputs of subsequent request data may include subsequent requests 160 corresponding to the inputs. Subsequent request data may be initial response 136, at least a keyword in initial response 136, initial request 112, and/or user document 120 and corresponding subsequent requests 160 that have already been determined whether manually, by machine, or any other method. Subsequent request data may include previous outputs such that subsequent request module 160 iteratively produces outputs. Subsequent request module 160 using a machine-learning process may output subsequent request 156 based on input of initial response 136, at least a keyword in initial response 136, initial request 112, and/or user document 120 and subsequent request data. In some embodiments, processor 104 may be configured to determine the subsequent request. In some embodiments, this may be done using subsequent request module 160. In some embodiments, subsequent request 156 may be determined based on posting 128.

Initial request 112 and subsequent request 156 may be included in a set of requests for a subset of users. For example, each industry, type of profession, and/or field of work may have an associated set of requests to procure a consistent set of information from user. As example, Processor 104 may determine that user is an accountant by user document 120, selected keyword, and/or initial response 136. Processor 104 may then prompt user with a set of requests, such as initial request 112 and/or subsequent request 156, associated with accountant. Processor 104 may ask "Are you a Certified Public Accountant?" If user's response is affirmative, processor 104 may ask user how many years of experience the user has as a CPA. Additional requests in the set of requests associated with accountants may include, for example, "What is your area of expertise?" and "Do you have experience in Accounts Receivable?" In some embodiments, processor 104 may be configured to determine which set of requests apply to user based on initial response 136. Processor 104 may determine a category corresponding to user. As used in this disclosure, a "category" is a profession and/or a field of work. For example, categories may include accountant, mechanical engineer, elementary school teacher, etc., and each category may have an associated set of requests. In these embodiments, inputs of subsequent request data may be initial responses 136, and outputs of subsequent request data may be categories corresponding to the initial responses 136, wherein the categories identify which set of requests apply to user. For example, categories may include accountant, mechanical engineer, elementary school teacher, etc., and each category may have an associated set of requests. Sets of requests may be stored in memory 108 or a database.

Processor 104 may be configured to receive a subsequent response 164 from user. As used in this disclosure, an "subsequent response" is a response by user to a subsequent request. Processor 104 may receive subsequent response 164 from a computing device, such as user device 116, through a network, from a database, and/or store the subsequent response 164 in memory 108 and retrieve from the memory 108. Subsequent response 164 may be included in video record 140. Subsequent response 164 may include credentials 152. Subsequent response 164 may be video record 140 of user responding to subsequent request 156, which may also include video record 140 of the subsequent request 156.

With continued reference to FIG. 1, processor 104 may be configured to determine a score 168 based on video record 140 including initial response 136 and subsequent response 164. Score 168 may reflect user's conversational ability. Score 168 may be based on verbal content 144, such as how often user said filler words. As used in this disclosure, a "filler word" is a word that is used to fill a lull in speech. Filler words may include "um", "like", "uh", and the like. For example, processor 104 may provide a 100 score 168 if user said no filler words in initial response 136 and subsequent response 164. Score 168 may be based on a duration of the initial response 136 and a duration of the subsequent response 164. For example, use of five filler words in initial response 136 of thirty-five seconds may receive a higher score 168 and use of five filler words in initial response 136 of twelve seconds.

Processor 104 may create video record 140 as a function of initial response 136 and subsequent response 164. Initial response 136 and subsequent response 164 may include a visual component. Video record 140 may include an audio recording of initial response 136 and subsequent response 164. In some embodiments, video record 140 may include all of initial response 136 and subsequent response 164. Video record 140 may include initial request 112 and subsequent request 156 so the context of initial response 136 and subsequent response 164 are preserved. Video record 140 may include just segments of initial response 136 and/or subsequent response 164 and exclude portions that are not substantive, such as pauses and camera adjustments.

Figure 2:
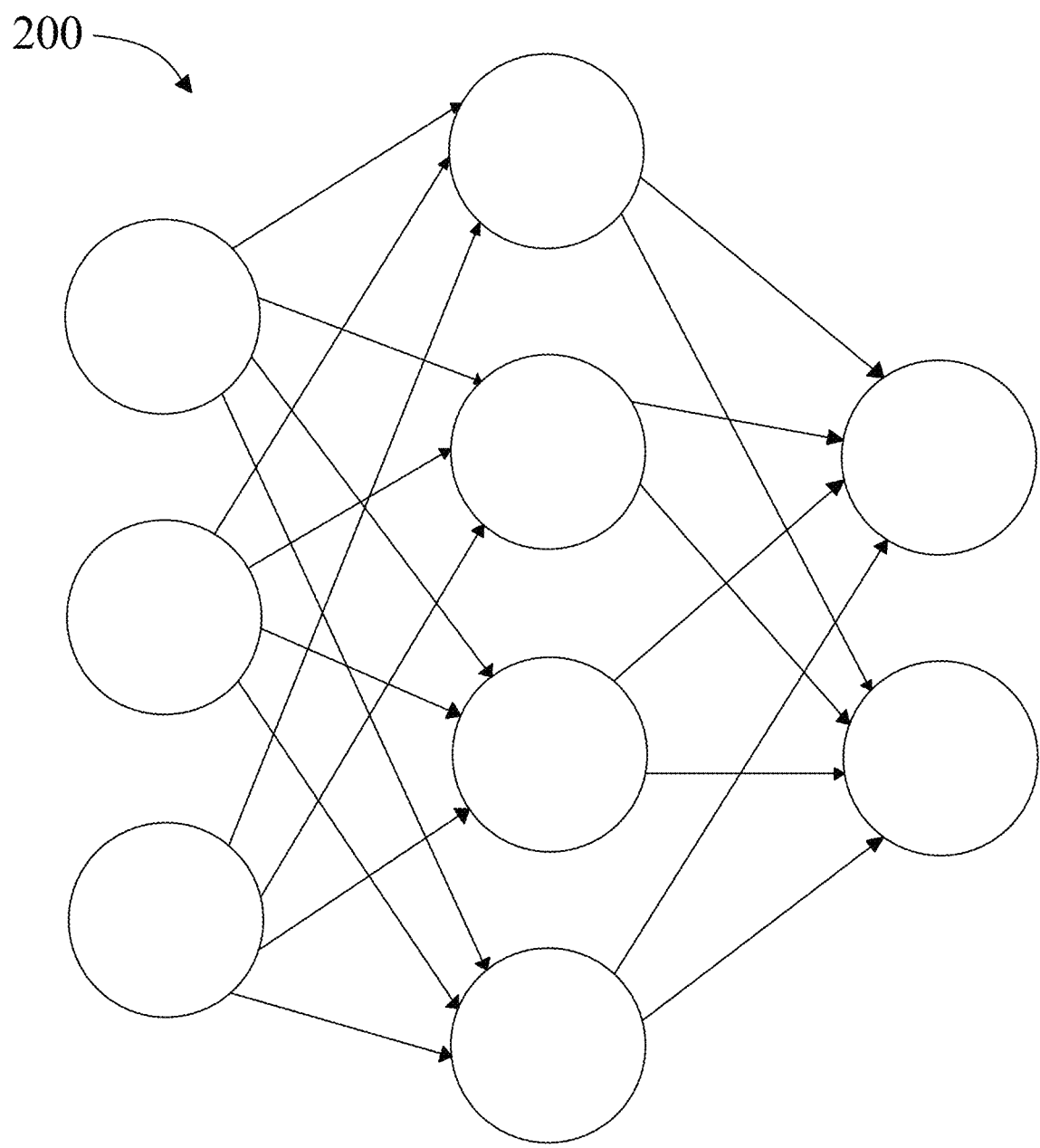
FIG. 2 illustrates an exemplary neural network.

Referring now to FIG. 2, an exemplary embodiment of neural network 200 is illustrated. A neural network 200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 3:
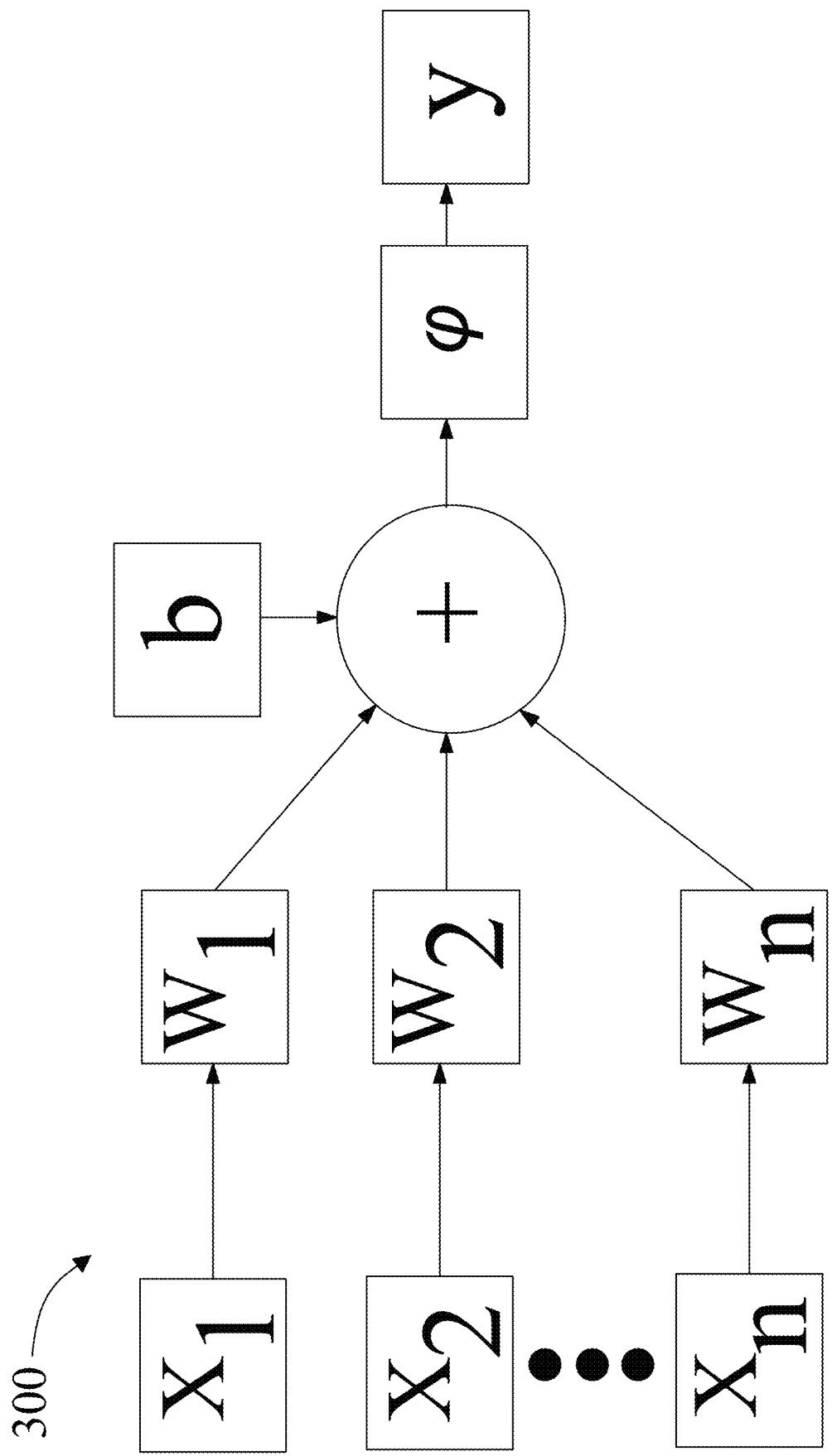
FIG. 3 is a block diagram of an exemplary node.

Referring now to FIG. 3, an exemplary embodiment of a node 300 of a neural network is illustrated. Node 300 may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 4:
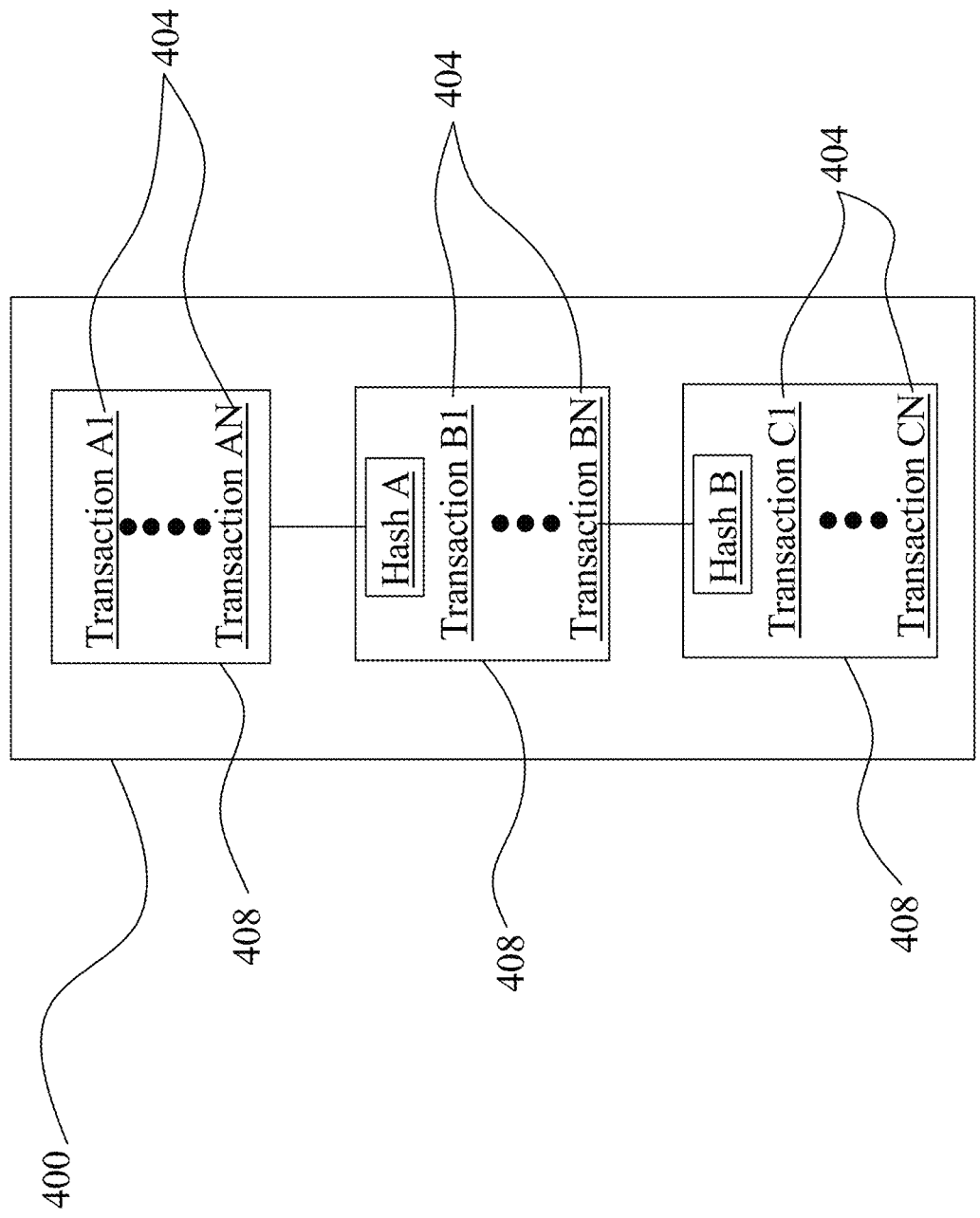
FIG. 4 is a block diagram of an exemplary immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertion. In one embodiment, a digitally signed assertion 404 is a collection of textual data signed using a secure proof as described in further detail below; secure proof may include, without limitation, a digital signature. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, in some embodiments, an address is a textual datum identifying the recipient of virtual currency or another item of value, such as initial response 136 and subsequent response 164, in a digitally signed assertion 404. In some embodiments, address may be linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. User document 120, Posting 128, initial response 136, subsequent response, video record 140, and/or score 168 may be posted on immutable sequential listing 400, such as blockchain. Training data for any machine-learning module discussed in this disclosure may be posted on immutable sequential listing 400, such as blockchain. A master list may be included. Master list may include a hash-table and/or distributed hash table which may be used to locate a requestor-linked data store. For example, a public key associated with a requestor containing location information pertaining to requestor-linked data store may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store when prompted. Using the hashed key, a hash function may compute an index that may suggest where requestor-linked data store may be found. Locating may also be performed by linking the at least an encrypted data record to a digital signature associated with the requestor. Requestor may produce a digital signature, which may then be linked to the at least an encrypted data record and locate to the location of the at least an encrypted data record. When the digital signature is presented, it may contain location information of the at least an encrypted data record and allow access control regulator to locate the precise location of encrypted data record. For example, digital signature may be generated using a public and/or private key linked to requestor which may contain location information of encrypted data record. In an embodiment, encrypted data record may be linked to a requestor key, so that when a requestor key is presented, location of encrypted data record becomes apparent. Locating may also be performed by information that may be contained in data access request. For example, a data access request associated with a user may contain location information of encrypted data record that requestor is attempting to access. When generating a data access request, requestor may specify the location of encrypted data record that may then be transmitted to access control regulator. Additional disclosure pertaining to immutable sequential listing can be found in U.S. patent application Ser. No. 17/486,461 filed on Sep. 27, 2021, and entitled "SYSTEMS AND METHODS FOR SCORE GENERATION FOR APPLICANT TRACKING", the entirety of which in incorporated herein by reference.

With continued reference to FIG. 4, the ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif, or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC×9.95 standard. In another embodiment, the trusted time ordering is provided by a group of entities collectively acting as the time stamping authority with a requirement that a threshold number of the group of authorities sign the timestamp. Immutable sequential listing 400 and/or any component of the immutable sequential listing 400, such as sub-listing 408 and digitally signed assertions 404, may be validated by processor 104 consistent with disclosure of validation in U.S. patent application Ser. No. 16/698,182 filed on Nov. 27, 2019 and titled "SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT", which is incorporated by reference herein in its entirety.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block."

An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain may contain a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408, protocol may adjust the algorithm to produce the next sub-listing 408 so that it will require more steps; where one sub-listing 408 takes more time for a given set of computing devices to produce the sub-listing 408, protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408. Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained in the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), 35ertifyicates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
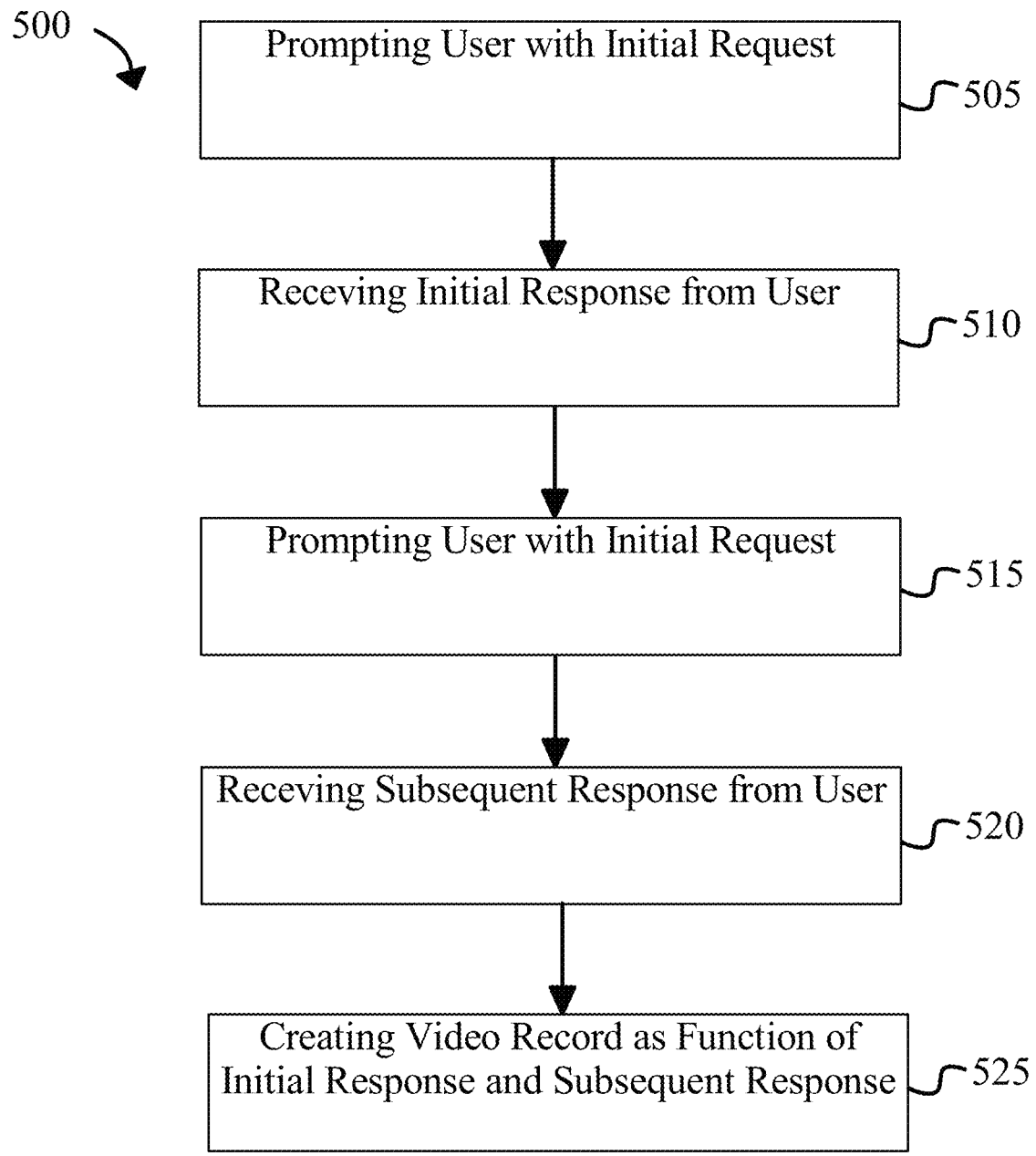
FIG. 5 is a flow diagram of an exemplary method for creating a video record.

Now referring to FIG. 5, an exemplary embodiment of a method 500 for creating a video record is illustrated. At step 505, processor prompts a user with initial request; this may be implemented, without limitation, as described above in reference to FIGS. 1-5. Prompting the user with initial request includes determining the initial request based on a posting. Processor may determine initial request based on user document. Processor may determine initial request based on keyword selected by user.

At step 510, processor receives initial response from user; this may be implemented, without limitation, as described above in reference to FIGS. 1-5.

At step 515, processor prompts user with subsequent request based on initial response; this may be implemented, without limitation, as described above in reference to FIGS. 1-5. Processor may generate subsequent request by utilizing a machine-learning module. In some embodiments, processor may determine and/or generate the subsequent request based on a posting. Processor may determine category corresponding to user. Subsequent request may be associated with category.

At step 520, processor receives subsequent response from user; this may be implemented, without limitation, as described above in reference to FIGS. 1-5. Initial response and subsequent response may include visual component.

At step 525, processor creates video record as a function of initial response and subsequent response; this may be implemented, without limitation, as described above in reference to FIGS. 1-5. Video record may include audio recording of initial response and subsequent response. In some embodiments, the processor may be configured to determine a score based on a duration of the initial response and a duration of the subsequent response.

Figure 6:
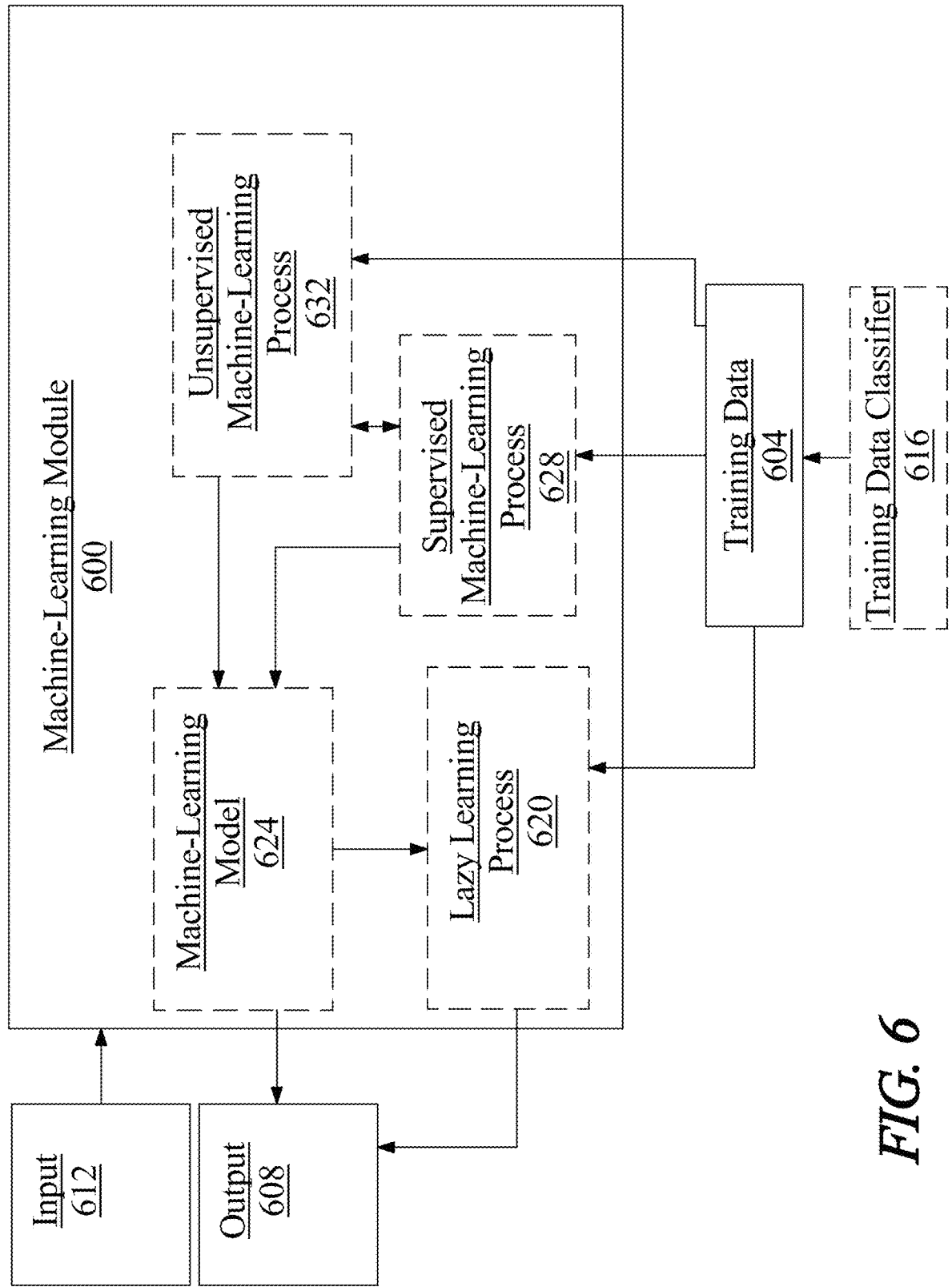
FIG. 6 is a block diagram of exemplary machine-learning processes.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example, input data may include user information such as user identification, and output data may include one or more sets of user activity data.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to user and/or user activity data.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may user information such as user identification as described above as inputs, one or more sets of user activity data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
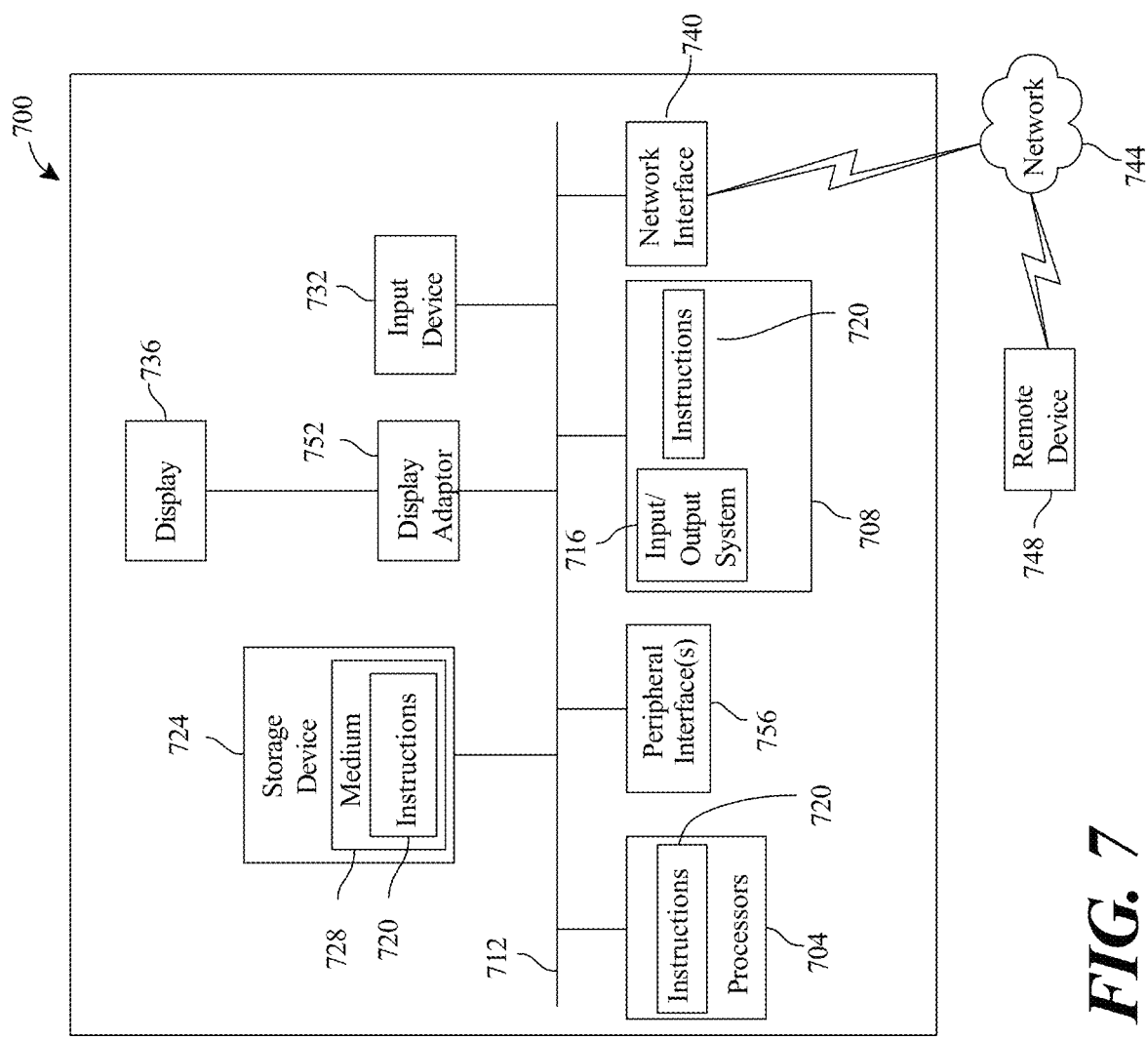
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for creating a video record, the apparatus comprising:
   at least a processor communicatively connected to a user device; and
   a memory communicatively connected to the processor, the memory containing instructions configuring the at least a processor to:

receive a selection of at least one posting from the user device;
receive a keyword from the user device, wherein the keyword further comprises optical character recognition;
prompt a user with an initial request, wherein prompting the user with an initial request comprises determining the initial request based on the at least one posting, and wherein the determining of the initial request comprising:
  iteratively training an initial request machine learning module using initial request training data, wherein the initial request training data correlates at least a keyword input to an initial request output, wherein correlating the at least a keyword input to the initial request output further comprises applying weighted values to the at least a keyword input and correlating the weighed values of the at least a keyword input;
  generating, using the trained initial request machine learning module, the initial request based on the at least one posting;
  retraining the initial request machine learning module with the updated initial request training data based on the weighted values;
receive an initial response, in video format including speech content comprising an audio and an image recording from the user in response to the initial request;
generate an audio vector, from the initial response, by using frequency coefficients or a spectrogram derived from raw audio samples;
generate an image vector, from the initial response, by implementing image processing for lip reading using a machine learning algorithm;
implement the machine learning algorithm comprising:
  training iteratively the machine learning algorithm using a training dataset applied to an input layer of nodes, one or more intermediate layers, and an output layer of nodes by creating one or more connections between the input layer of nodes and the output layer of nodes;
  adjusting the one or more connections and one or more weights between nodes in adjacent layers of the machine learning algorithm to iteratively update the output layer of nodes by updating the training dataset applied to the input layer of nodes; and
  calculating a weighted sum of the input layer of nodes by adding a bias to the weighted sum of the input layer of nodes;
predict the speech content in the initial response by concatenating the generated image vector and the audio vector;
prompt the user with a subsequent request based on the predicted speech content of the initial response;
receive a subsequent response from the user in response to the subsequent request; and
create a video record as a function of the initial response and the subsequent response, wherein the video record excludes pauses and camera adjustments within the initial response and the subsequent response.

2. The apparatus of claim 1, wherein the processor is configured to determine the initial request based on a user document.

3. The apparatus of claim 1, wherein the processor is configured to determine the initial request based on the keyword selected by the user.

4. The apparatus of claim 1, wherein the processor is configured to determine the subsequent request based on the at least one posting.

5. The apparatus of claim 1, wherein the initial response and the subsequent response comprise a visual component.

6. The apparatus of claim 1, wherein the processor, utilizing the initial request machine-learning module, is configured to output the subsequent request based on an input of the initial response.

7. The apparatus of claim 6, wherein the processor is configured to determine a category corresponding to the user.

8. The apparatus of claim 7, wherein the subsequent request is associated with the category.

9. The apparatus of claim 1, wherein the video record comprises an audio recording of the initial response and the subsequent response.

10. The apparatus of claim 1, wherein the processor is configured to determine a score based on a duration of the initial response and a duration of the subsequent response.

11. A method for creating a video record, the method comprising:
prompting, by a processor, a user with an initial request;
receiving, at the processor, an initial response from the user;
  receiving, at the processor, a selection of at least one posting from the user device;
  receiving, at the processor, a keyword from the user device, wherein the keyword further comprises optical character recognition;
  prompting, by the processor, the user with a subsequent request based on the initial response, wherein prompting the user with an initial request comprises determining the initial request based on the at least one posting, and wherein the determining of the initial request comprising:
iteratively training an initial request machine learning module using initial request training data, wherein the initial request training data correlates at least a keyword input to an initial request output, wherein correlating the at least a keyword input to the initial request output further comprises applying weighted values to the at least a keyword input and correlating the weighed values of the at least a keyword input;
generating, using the trained initial request machine learning module, the initial request based on the at least one posting;
retraining the initial request machine learning module with the updated initial request training data based on the weighted values;
  receive an initial response, in video format including speech content comprising an audio and an image recording from the user in response to the initial request;
  generate an audio vector, from the initial response, by using frequency coefficients or a spectrogram derived from raw audio samples;
  generate an image vector, from the initial response, by implementing image processing for lip reading using a machine learning algorithm;
  implement the machine learning algorithm comprising:
    training iteratively the machine learning algorithm using a training dataset applied to an input layer of nodes, one or more intermediate layers, and an output layer of nodes by creating one or more connections between the input layer of nodes and the output layer of nodes;

adjusting the one or more connections and one or more weights between nodes in adjacent layers of the machine learning algorithm to iteratively update the output layer of nodes by updating the training dataset applied to the input layer of nodes; and calculating a weighted sum of the input layer of nodes by adding a bias to the weighted sum of the input layer of nodes;

predict the speech content in the initial response by concatenating the generated image vector and the audio vector;

prompt the user with a subsequent request based on the predicted speech content of the initial response;

receiving, at the processor, a subsequent response from the user in response to the subsequent request; and creating, by the processor, a video record as a function of the initial response and the subsequent response, wherein the video record excludes pauses and camera adjustments within the initial response and the subsequent response.

12. The method of claim 11, wherein the processor is configured to determine the initial request based on a user document.

13. The method of claim 11, wherein the processor is configured to determine the initial request based on the keyword selected by the user.

14. The method of claim 11, wherein the processor is configured to determine the subsequent request based on the at least one posting.

15. The method of claim 11, wherein the initial response and the subsequent response comprise a visual component.

16. The method of claim 11, wherein the processor, utilizing the initial request machine-learning module, is configured to output the subsequent request based on an input of the initial response.

17. The method of claim 16, wherein the processor is configured to determine a category corresponding to the user.

18. The method of claim 17, wherein the subsequent request is associated with the category.

19. The method of claim 11, wherein the video record comprises an audio recording of the initial response and the subsequent response.

20. The method of claim 11, wherein the processor is configured to determine a score based on a duration of the initial response and a duration of the subsequent response.

* * * * *